Nov. 28, 1961 G. C. PSAROS 3,010,353
DRIVE-IN SHEET METAL CONNECTOR WITH A TOOL RECEIVING BORE
Filed March 12, 1959
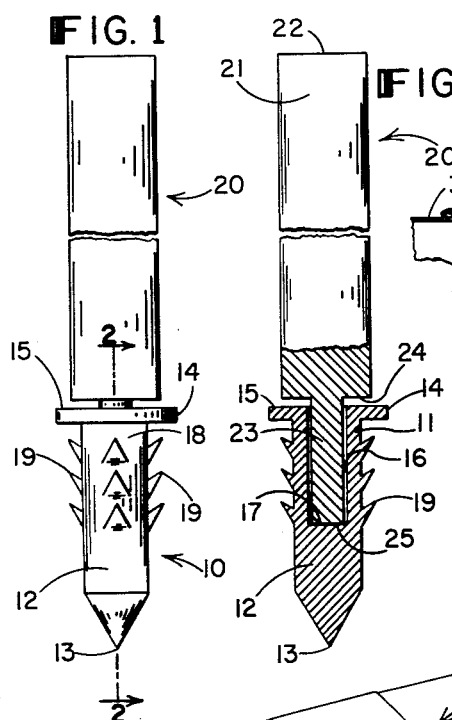
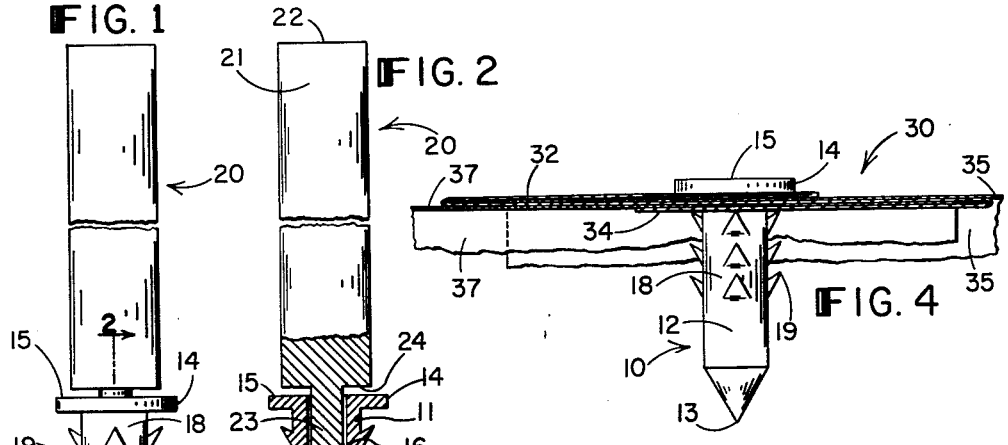
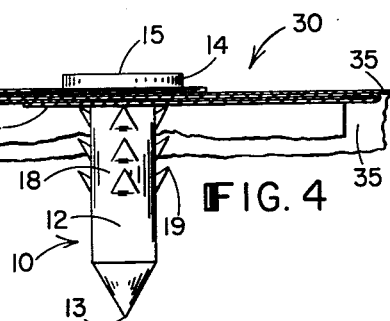
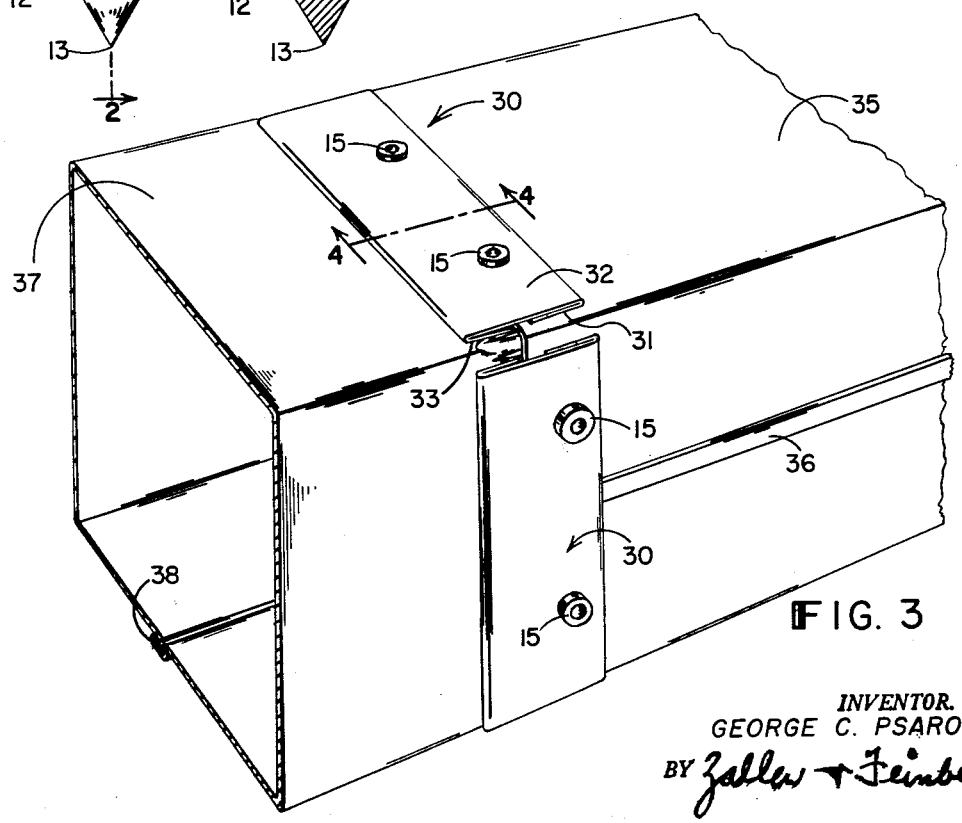
INVENTOR.
GEORGE C. PSAROS
BY *Zaller + Feinberg*
ATTORNEYS.

United States Patent Office 3,010,353
Patented Nov. 28, 1961

3,010,353
DRIVE-IN SHEET METAL CONNECTOR WITH A TOOL RECEIVING BORE
George C. Psaros, 23 George Road, Quincy, Mass., assignor of one-tenth to Charles J. Kelcourse
Filed Mar. 12, 1959, Ser. No. 798,996
1 Claim. (Cl. 85—21)

This invention relates to fastening devices and more particularly to those for fastening together layers of sheet metal.

One of the uses for which this improvement is primarily designed is for uniting and fastening together lengths of sheet metal which have been prefabricated into sections of various configurations to be used as ducts for ventilation, air conditioning and the like.

At the present time, adjoining sections of sheet metal are aligned with prepunched reversed S clips, into the open ends of which are inserted the adjacent ends of two metal sections which overlap within the clip forming a so-called S slip joint. Holes are then driven through the aligned section ends with a metal awl and conventional metal to metal screws are inserted into holes and turned into place.

Such screws are difficult to insert into the driven openings, are hard to turn into place in the holes, particularly when the duct line is being positioned in an awkward or inconvenient location. In addition, such a method of construction is time consuming and expensive.

A primary object of the invention is to provide a fastener for sheet metal construction and assembly which is driven into position by a hammer and a driver tool. It is easy to use, positive in its holding action, and labor saving.

The device consists of a drive-in duct pin and an associated cooperating driver tool. The pin has a hollow cylindrical upper portion and a solid lower shank portion terminating in a sharp penetrating point. The upper portion has a flanged or annular head used for gripping but not for percussion purposes. The cavity of the hollow portion has a base surface against which the driver tool rests during the driving operation. The outside longitudinal surface of the hollow portion has a multiplicity of upwardly extending barbs independent of each other. The entire pin is case hardened by any acceptable method sufficiently for entering sheet metal. The driver tool has a percussion head and a pin contacting toe which is adapted to fit into the cavity of the hollow portion of the pin. The toe is longer than the length of the hollow portion so that the force of a blow on the head of the driver tool is transmitted directly to the base of the cavity. The toe is long enough and the cavity deep enough so that when the toe is inserted into the cavity of the pin, the combination is kept in longitudinal alignment during the driving process.

The percussion head, the pin contacting toe, the hollow cylindrical upper portion of the pin, the lower shank portion of the pin and the penetrating point portion of the pin, therefore, have a common longitudinal axis during the driving process.

The driver tool is magnetized to hold the pin in place on the toe of the driver while it is being positioned, prior to and during driving.

Further objects and a fuller understanding of the invention will hereinafter appear from the following description of a preferred embodiment illustrative of the invention and shown in the accompanying drawings in which FIGURE 1 is a side view of the pin with the driver tool in place;

FIGURE 2 is a section of FIGURE 1 taken on line 2—2;

FIGURE 3 is a perspective view of two sections of duct with S clips and duct pins in place; and FIGURE 4 is a section of FIGURE 3 taken on line 4—4.

Referring to the drawings, the device therein shown as illustrative of one embodiment of my invention comprises a drive-in duct pin 10, having a hollow cylindrical upper section 11, a solid lower shank portion 12 terminating in a conical tip with a penetrating point 13. The outside diameter of the shank is slightly smaller than the diameter of the driven holes into which it is to be inserted. The pin 10 has a flanged or annular head 14 with a top surface 15. The cavity 16 in the hollow portion 11 has a base surface 17. The outside longitudinal surface 18 of pin 10 has a multiplicity of upwardly extending barbs 19. These barbs, independent of each other, may be in even rows or in staggered rows longitudinally or transversely. They may extend from the outside surface of the hollow portion or from the outside surface of the shank portion or from both, depending on intended use.

The driver tool 20 has a percussion head 21, with a striking surface 22, and a pin contacting toe 23, forming a shoulder 24 and having a lower pin contacting surface 25. The S clip 30, conventionally used for uniting sections of sheet metal together, comprises an under-bend 31, a top layer 32, a central layer 33, and a bottom layer 34. Registering holes are punched through all four layers 31, 32, 33, and 34.

One section of duct 35 may be fabricated with a groove seam 36, another section of duct 37 may be fabricated with a grooved seam 38, or by any other conventional method of forming duct seams.

In assembly, each side of a female section 35 is inserted between layers 32 and 33 of an S clip 30. Likewise each side of a male section 37 is inserted between layers 33 and 34 of the corresponding clip. A sharp pointed metal piercing awl is then driven through the punched holes with sheets 35 and 37 in place. The resulting driven holes in sheets 35 and 37 are formed with burrs around their edges and are aligned with the punched holes.

The toe 23 of the driver tool 20 is then inserted into the cavity 16 of the hollow cylindrical upper section 11 of the pin 10, the lower surface 25 of the toe 23 resting on the base 17 of the cavity 16. The shoulder 24 of the driver tool is not in contact with the top surface 15 of the head 14.

The point 13 of the pin is then inserted in the outer orifice of the aligned holes. Blows of a hammer applied to the percussion head of the driver tool forces the pin through the assembled layers of sheet metal in the clip and duct sections.

Continued blows force the pin inwardly into the duct until the bottom of the head is in contact with the outside surface of the S clip, the barbs having been forced through the punched holes and burred edges of the aligned layers, and due to their upwardly extending direction, now firmly lock together the layers of the clip and the sections of the duct. The driver tool is then withdrawn from the positioned pin.

This operation is then repeated until all pins have been positioned. This is a very fast and positive operation.

While the preferred embodiment of my invention has been described in detail, it will be understood that I do not wish to be limited to the particular construction set forth, since various changes in the form, material, proportions, and arrangement of parts, and in the details of construction may be resorted to without departing from the spirit and scope of the invention, or destroying any of the advantages contained in the same, heretofore described and defined in the following claim.

I claim:

A one piece drive-in duct connector pin for connecting together the flat surface of a plurality of layers of sheet metal, comprising an upper hollow cylindrical upper portion with an annular enlarged thin gripping head on one end and a lower solid cylindrical shank portion with a penetrating point on the other end, said upper and lower cylindrical portions having the same diameter, the outside longitudinal surface of said upper hollow portion being provided with a multiplicity of upwardly extending barbs, said head extending radially beyond said barbs, said barbs being substantially oblique triangular pyramidical in shape and extending upwardly towards said head, the cylindrical bore in said hollow portion having a transverse flat bottom and being adapted to receive and align a removable driver tool to force said pin through said metal sheets by contacting said flat bottom, said pin being adapted to lock said flat surfaces of said sheet metal between the bottom of said head and the tops of the contiguous upwardly extending barbs.

References Cited in the file of this patent

UNITED STATES PATENTS

| | | |
|---|---|---|
| 472,913 | Taylor | Apr. 12, 1892 |
| 676,827 | Williams | June 18, 1901 |
| 895,080 | Eisenreich | Aug. 4, 1908 |
| 1,156,811 | Prince | Oct. 12, 1915 |
| 1,769,591 | McIntosh | July 1, 1930 |
| 2,393,923 | Miller | Jan. 29, 1946 |
| 2,412,517 | Klein | Dec. 10, 1946 |
| 2,562,721 | Jakosky | July 31, 1951 |
| 2,759,389 | Corckran | Aug. 21, 1956 |
| 2,816,473 | Labbee | Dec. 17, 1957 |

FOREIGN PATENTS

| | | |
|---|---|---|
| 480,264 | Italy | Apr. 24, 1953 |
| 61,878 | France | May 18, 1955 |